(12) United States Patent
Kim et al.

(10) Patent No.: US 12,517,833 B2
(45) Date of Patent: Jan. 6, 2026

(54) ELECTRONIC DEVICES, INCLUDING MEMORY DEVICES, AND OPERATING METHODS THEREOF

(71) Applicant: SAMSUNG ELECTRONICS CO., LTD., Suwon-si (KR)

(72) Inventors: Moongyung Kim, Suwon-si (KR); Youngsik Eom, Suwon-si (KR); Donghyeon Ham, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/762,201

(22) Filed: Jul. 2, 2024

(65) Prior Publication Data

US 2025/0077437 A1 Mar. 6, 2025

(30) Foreign Application Priority Data

Aug. 31, 2023 (KR) .................. 10-2023-0115276
Nov. 23, 2023 (KR) .................. 10-2023-0164516

(51) Int. Cl.
*G06F 12/0873* (2016.01)
*G06F 12/0891* (2016.01)

(52) U.S. Cl.
CPC ...... *G06F 12/0873* (2013.01); *G06F 12/0891* (2013.01)

(58) Field of Classification Search
CPC .. G06F 1/3225; G06F 1/3275; G06F 12/0873; G06F 12/0877; G06F 12/0891; G06F 12/0895; G06F 2212/1028; G11C 5/14; G11C 11/419
See application file for complete search history.

(56) References Cited

U.S. PATENT DOCUMENTS

| | | | |
|---|---|---|---|
| 7,263,624 B2 | 8/2007 | Marchand et al. | |
| 8,046,566 B2 | 10/2011 | Abernathy et al. | |
| 10,747,712 B1 | 8/2020 | Agarwal | |
| 2016/0202986 A1 | 7/2016 | Ayub et al. | |
| 2017/0371786 A1 | 12/2017 | Srinivasan et al. | |
| 2018/0074964 A1* | 3/2018 | Lai | G06F 12/0842 |

* cited by examiner

*Primary Examiner* — Aracelis Ruiz
(74) *Attorney, Agent, or Firm* — Fish & Richardson P.C.

(57) ABSTRACT

The present disclosure relates to an electronic device, a memory device, and an operating method of the memory device. An example memory device includes a first bank, a second bank, and a cache controller. The cache controller is configured to set a hash function based on a power control signal that comprises instructions to stop supplying power to the first bank, and to map the first address and the second bank based on the hash function and a first transaction provided by a master after the power control signal is input.

15 Claims, 16 Drawing Sheets

ELECTRONIC DEVICES, INCLUDING MEMORY DEVICES, AND OPERATING METHODS THEREOF

CROSS-REFERENCE TO RELATED APPLICATIONS

This application claims priority to Korean Patent Application Nos. 10-2023-0115276, filed on Aug. 31, 2023 and 10-2023-0164516, filed on Nov. 23, 2023 in the Korean Intellectual Property office, the disclosures of which are incorporated by reference herein in their entirety.

BACKGROUND

Semiconductor memories are widely used for storing data in various electronic devices, such as a computer, and wireless communication devices. Among static random-access memories (RAMs) (SRAMs), which is a kind of semiconductor memory, single port SRAM and dual port SRAM capable of performing a read operation and a write operation at a higher speed than the single port SRAM have been developed. In typical single port SRAM, one unit memory cell may include six transistors that perform read and write operations sequentially, while dual port SRAM may be configured to perform read and write operations in dual mode by adding two active transistors to typical single port SRAM to be used in integrated circuits that require ultra-high speed.

SUMMARY

The present disclosure relates to an electronic device for improving accuracy of an operation, reliability of the electronic device, performance deterioration due to cache miss, blackout time, operation time of a flush operation, response time, or the like, and an operating method of the memory device.

In general, according to some aspects, a memory device includes: a first bank configured to receive power and store at least one cacheline corresponding to a first address group; a second bank configured to receive the power and store at least one cacheline corresponding to a second address group; and a cache controller configured to set a hash function based on a power control signal instructing to suspend supply of the power to the first bank, and map the first address and the second bank, based on the hash function, a first address provided by a master after the power control signal is input, and a first transaction including a first target indicating the first bank.

In general, according to some aspects, a memory device includes: a first bank configured to receive power in response to a power control signal instructing to supply the power; a second bank configured to store at least one first cacheline corresponding to a first address group provided before the first bank receives the power, and store at least one second cacheline corresponding to the second address group; and a cache controller configured to set a hash function based on the power control signal, and map the first address to the first bank, based on the hash function, a first address provided by a master after the power control signal is input, and a first transaction including a second target indicating the second bank.

In general, according to some aspects, an operating method of a memory device including: in response to a power control signal instructing whether to supply power to a first bank group, flushing cachelines stored in a bank group selected among a first bank group and a second bank group; based on a hash function selected according to the power control signal from among a plurality of hash functions different each other and a transaction provided by a master, forwarding a cacheline to be mapped to an unselected bank group among the cachelines stored in the selected bank group to the unselected bank group; and providing, to the master, a response signal notifying to change a hash function of the master.

In general, according to some aspects, an electronic device including: a power manager configured to generate power and output a power control signal instructing whether to supply the power; a memory including a first bank group, a second bank group, and a cache controller configured to set a hash function in response to the power control signal and to map, based on the hash function, a first address corresponding to the first bank group to a bank group selected according to the power control signal among the first bank group and the second bank group; and a processor including a first hash function configured to output a first target indicating the first bank group from a first address group and output a second target indicating the second bank group from a second address group, and a second hash function configured to output the second target from the second address group, the processor configured to provide a transaction including the first address to the memory based on a hash function selected among the first hash function and the second hash function.

BRIEF DESCRIPTION OF THE DRAWINGS

Implementations will be more clearly understood from the following detailed description taken in conjunction with the accompanying drawings.

DETAILED DESCRIPTION

Hereinafter, implementations of the present disclosure will be described in detail with reference to the accompanying drawings.

Figure 1:
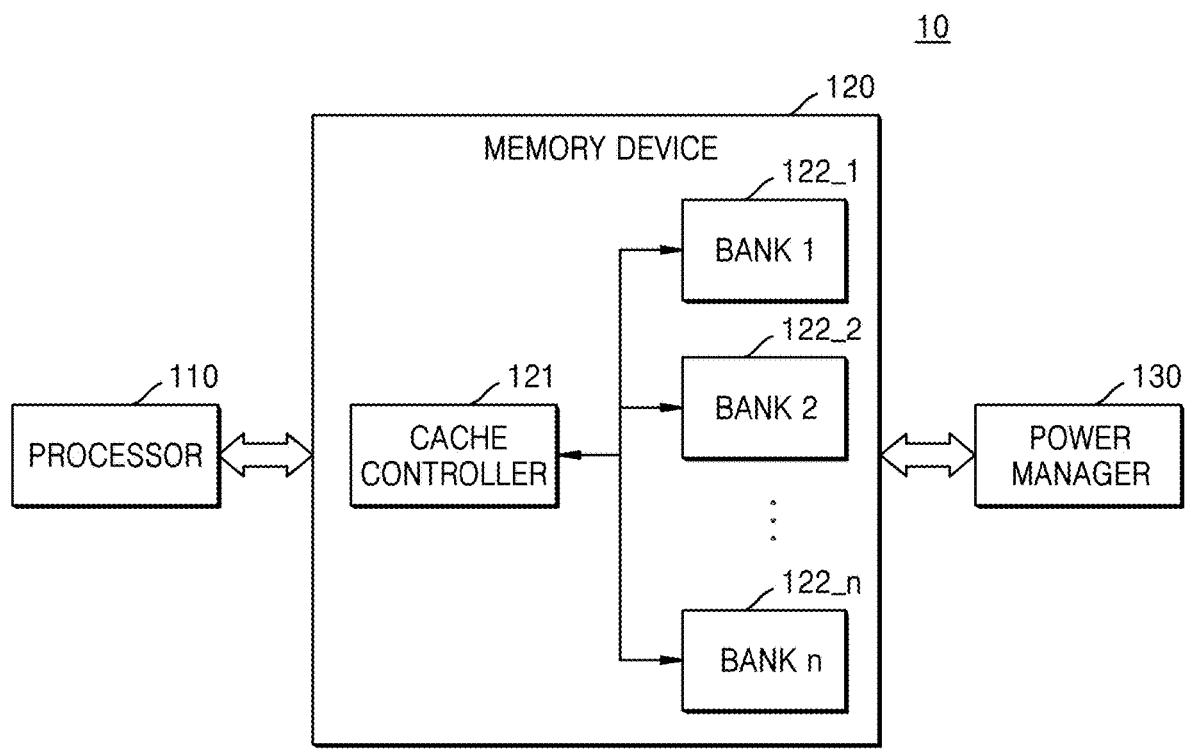
FIG. 1 is a block diagram of an example of an electronic device.

FIG. 1 is a block diagram of an example of an electronic device 10.

Referring to FIG. 1, the electronic device 10 may be included in a mobile device, such as a smartphone and a wearable device, and in this case, the electronic device 10 may be implemented as an application processor (AP) or a system-on-a-chip (SoC). However, the implementation is not limited thereto, and the electronic device 10 may be included in a computing device, such as a personal computer (PC), a tablet PC, and a server.

The electronic device 10 may include a processor 110, a memory device 120, and a power manager 130.

The processor 110 may include a device capable of processing data, such as a central processing unit (CPU), a natural processing unit (NPU), a graphics processing unit (GPU), and an AP. The processor 110 may execute an operating system (OS) and/or various applications. The processor 110 may transmit a transaction requesting a particular operation to be performed to the memory device 120. In addition, the processor 110 may receive a response to the transaction from the memory device 120. For example, the processor 110 may transmit a transaction including a read request and an address to the memory device 120, and the memory device 120 may read data stored in a memory area corresponding to the address. However, the implementation is not limited thereto. In some implementations, to transfer a transaction to any one of first through (n)th banks 122_1 through 122_n of the memory device 120, the processor 110 may provide, to the memory device 120, a target and a transaction indicating a particular bank by using a hash function and a transaction stored in the processor 110. The processor 110 may be referred to as a master.

The memory device 120 may perform an operation by receiving power from the power manager 130. The memory device 120 may be referred to as a memory. The memory device 120 may include a cache controller 121 and the first through (n)th banks 122_1 through 122_n. The cache controller 121 may receive a transaction from the processor 110. The cache controller 121 may transfer the transaction to the corresponding bank to access the bank corresponding to the address included in the transaction. In some implementations, the cache controller 121 may set a hash function in response to a power control signal and may map a first address based on the hash function and corresponding to a first bank group to a bank group selected from among the first bank group and the second bank group according to the power control signal. The first bank group and the second bank group may receive power from the power manager 130 to operate independently. The first bank group may include at least one of the first through (n)th banks 122_1 through 122_n. The second bank group may include the remaining banks other than the at least one of the first through (n)th banks 122_1 through 122_n of the first bank group. In implementations, the first bank group may include at least one bank capable of interrupting power supply in an on-state of the electronic device 10, and the second bank group may include at least one bank designed to always supply power in an on-state of the electronic device 10. The power control signal may be generated by the power manager 130. The power control signal may direct whether the power is to be supplied to the first bank group. The number of the first through (n)th banks 122_1 through 122_n may be n. n may be an integer of 2 or more. Each of the first through (n)th banks 122_1 through 122_n may receive power generated by the power manager 130, may operate independently. A bank may also be referred to as a slice.

In some implementations, the memory device 120 may be implemented as static random access memory (RAM) (SRAM). The SRAM may be used as a cache in a computing device. To improve throughput representing data throughput per unit time of cache, an independently operable bank structure may be applied to the SRAM. The bank structure may be a structure in which pieces of cache are partitioned so that every partition is accessed at the same time. When relatively low performance is required by the SRAM of a bank structure, power of some banks may be off for power saving. On the other hand, when high performance is required by SRAM of a bank structure, power may be supplied to a bank in which power has been turned off. When a power mode is transitioned, cachelines mapped to the power-off bank may need to be redirected to the power-on bank. In addition, to ensure a normal operation, while necessary tasks are being completed before the power mode is switched from a previous power mode to a new current power mode, an operation of the processor 110 may also need to stop. In this manner, the time during which the operation of the processor 110 is completed before the power mode is switched may be referred to as blackout time. When the blackout time increases, because the time for processing the operation of the processor 110 may be delayed, the blackout time may require to be reduced.

The power manager 130 may generate power. The power generated by the power manager 130 may be supplied to the processor 110 and/or the memory device 120. In some implementations, the power generated by the power manager 130 may be supplied to at least one of the first through (n)th banks 122_1 through 122_n. The power manager 130 may output a power control signal indicating whether power is supplied to the first bank group among the first through (n)th banks 122_1 through 122_n. In some implementations, the power manager 130 may output a power control signal indicating whether power to be supplied to at least one bank is supplied (for example, turned off or turned on). In some implementations, the power manager 130 may output a power control signal directing a first mode, in which power is supplied to only one particular bank (for example, the first bank 122_1) among the first through (n)th banks 122_1 through 122_n, a second mode, in which power is supplied to only a pre-set number (for example, n/2) of banks among the first through (n)th banks 122_1 through 122_n, or a third mode, in which power is supplied to the first through (n)th banks 122_1 through 122_n. According to some implementations, the power manager 130 may be implemented as a power management unit (PMU).

The memory device 120 of the present disclosure may reduce the blackout time while improving performance degradation in a system that controls power-performance balance by using dynamic cache size adaptation. The memory device 120 of the present disclosure may be implemented as an L1 cache or an L2 cache of a CPU, or may also be implemented as an L3 cache of a CPU cluster. Alternatively, the memory device 120 of the present disclosure may be implemented as a cache embedded in a GPU or NPU and as a last level cache (LLC) present in a bus interconnect. Alternatively, the memory device 120 of the present disclosure may be implemented as an L3 cache including four or more banks supporting a plurality of MASTERs via a plurality of cores and a plurality of ports in a CPU cluster used in an SoC of a mobile device.

According to some implementations described above, in the electronic device 10, the accuracy of the operation thereof may be increased, malfunction may be prevented, the reliability thereof may be improved, performance degradation due to cache miss may be prevented, the blackout time may be reduced, the operation time of the flush operation may be reduced, and the response time thereof may be improved.

Figure 2A:
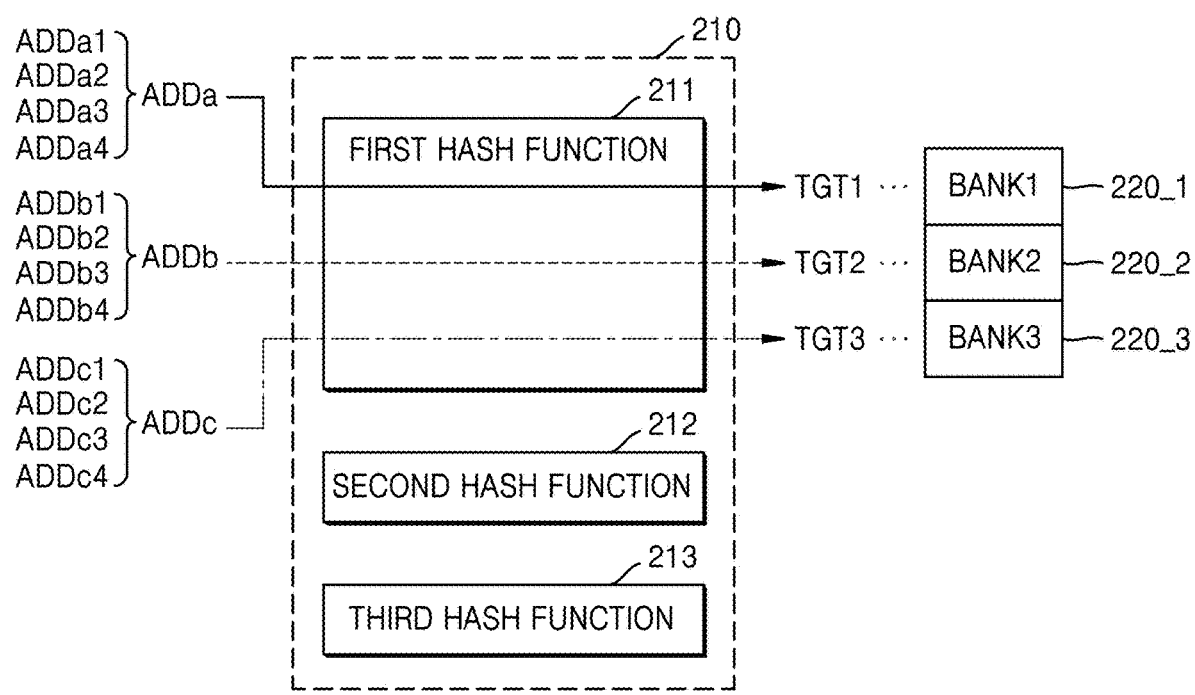
FIGS. 2A, 2B, and 2C are example diagrams for describing hash functions.
Figure 2B:
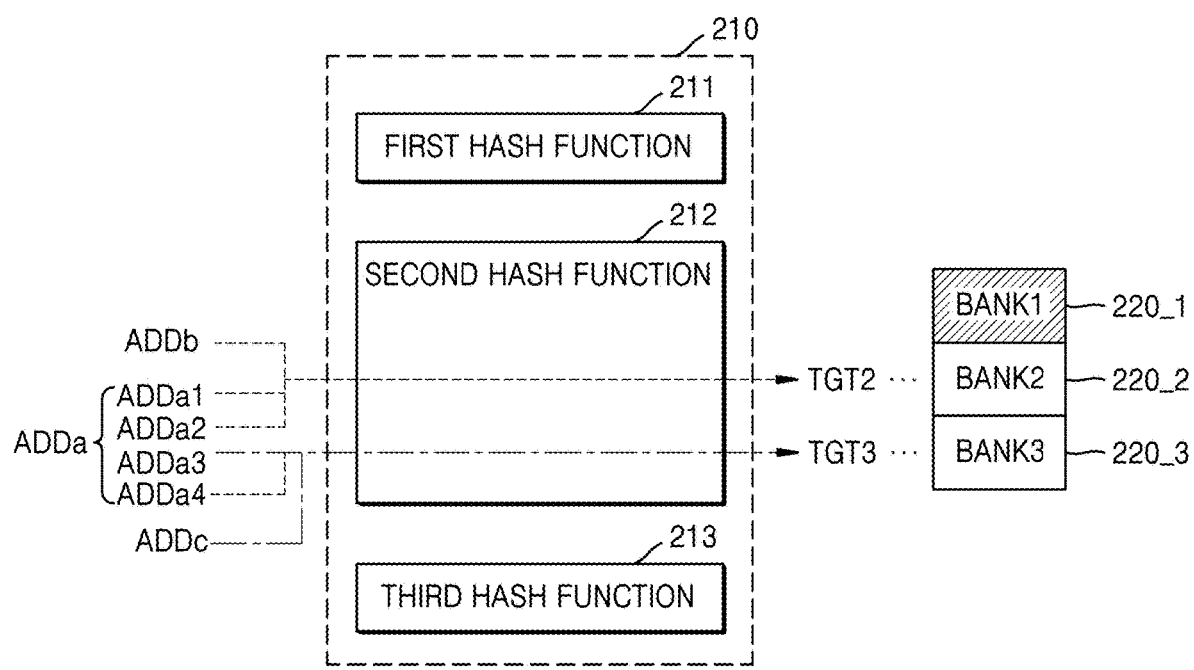
Figure 2C:
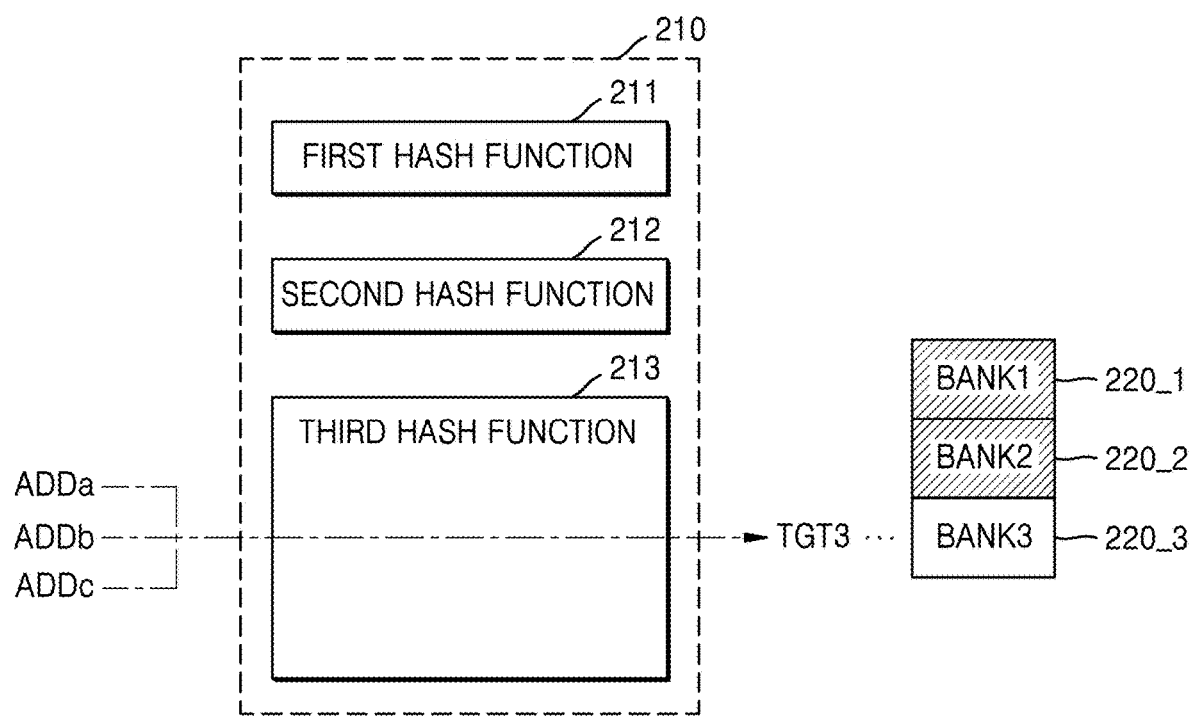

FIGS. 2A, 2B, and 2C are example diagrams of describing hash functions.

Referring to FIGS. 1, 2A, 2B, and 2C, each of the processor 110 and the cache controller 121 may set a hash function by selecting any one of a plurality of hash functions 210. In some implementations, after the cache controller 121 changes the hash function, the processor 110 may change the hash function. For example, the cache controller 121 may change the hash function according to the power control signal of the power manager 130 among the plurality of hash functions 210, the processor 110 may receive a response signal (or an acknowledgement signal) from the cache controller 121, and may change the hash function according to the response signal of the cache controller 121 among the plurality of hash functions 210.

The cache controller 121 may select any one hash function according to the power control signal of the power manager 130 from the plurality of hash functions 210, the processor 110 may receive a response signal (or an acknowledgement signal) from the cache controller 121, and may select any one hash function according to the response signal of the cache controller 121 from the plurality of hash functions 210. A plurality of banks may include the first through third banks 220_1 through 220_3, and the plurality of hash functions 210 may include first through third hash functions 211 through 213. However, the implementation is not limited thereto.

Each address group may be input to a hash function, and a target indicating a bank may be output as an output of the hash function. In some implementations, an address included in each address group may include information required to identify whether a block in a cache is requested by the processor 110, and may include a tag field including upper portion bits of the address, and an index field including an index value indicating a particular way among a plurality of ways. The address may further include an offset field including an offset value. In this case, the tag field and the index field may be input to the hash function.

In some implementations, the power control signal may instruct to supply power to at least one of the plurality of banks. For example, the power control signal may instruct to supply power to only one of the first through third banks 220_1 through 220_3. As another example, the power control signal may instruct to supply power to only two banks of the first through third banks 220_1 through 220_3. As another example, the power control signal may instruct to supply power to all of the first through third banks 220_1 through 220_3. According to some implementations, the first bank group may include the first and second banks 220_1 and 220_2, and the second bank group may include the third bank 220_3. In some implementations, the power control signal may also instruct to stop supplying power to one bank or two banks among the three banks. Hereinafter, it is assumed that the power control signal instructs to supply power to at least one bank.

Referring to FIG. 2A, a first hash function 211 may be selected from among the plurality of hash functions 210. In some implementations, when the first through third banks 220_1 through 220_3 are all powered on, the processor 110 and the cache controller 121 may select the first hash function 211. The first hash function 211 may receive a first address group ADDa and output a first target TGT1 indicating the first bank 220_1 (or representing the first bank 220_1) to the first bank 220_1. Alternatively, the first hash function 211 may receive a second address group ADDb and output a second target TGT2 indicating the second bank 220_2 to the second bank 220_2. Alternatively, the first hash function 211 may receive a third address group ADDc and output a third target TGT3 indicating the third bank 220_3 to the third bank 220_3.

Referring to FIG. 2B, a second hash function 212 may be selected from among the plurality of hash functions 210. In some implementations, one bank of the first through third banks 220_1 through 220_3 may be powered off. For example, power supplied to the first bank 220_1 may be stopped. Because power supply to the first bank 220_1 has stopped, the first address group ADDa may need to be remapped to the second bank 220_2 or the third bank 220_3 except for the first bank 220_1. For example, the first address group ADDa may include a plurality of first addresses (for example, ADDa1, ADDa2, ADDa3, and ADDa4), and some of the first addresses (for example, ADDa1 and ADDa2) among the plurality of first addresses (for example, ADDa1, ADDa2, ADDa3, and ADDa4) may be mapped to the second bank 220_2, and the other first addresses (for example, ADDa3 and ADDa4) among the plurality of first addresses (for example, ADDa1, ADDa2, ADDa3, and ADDa4) may be mapped to the third bank 220_3. The implementation of mapping some addresses to a bank is not limited to FIG. 2B and may be designed in various ways. It is illustrated that the number of the first addresses (for example, ADDa1, ADDa2, ADDa3, and ADDa4) may be four but this is only an example. In some implementations, when the first bank 220_1 is powered off, the processor 110 and the cache controller 121 may select the second hash function 212. Like the first hash function 211, the second hash function 212 may receive the second address group ADDb or the third address group ADDc and output the second target TGT2 or the third target TGT3 to the second bank 220_2 or the third bank 220_3, respectively. Alternatively, the second hash function 212 may receive each of some of the first addresses ADDa1 and ADDa2 and output the second target TGT2 to the second bank 220_2. Alternatively, the second hash function 212 may receive each of the other of the first addresses ADDa3 and ADDa4 and output the third target TGT3 to the third bank 220_3.

Referring to FIG. 2C, a third hash function 213 may be selected from among the plurality of hash functions 210.

In some implementations, two of the first bank through third bank 220_1 through 220_3 may be powered off. For example, power supplied to the first bank 220_1 and the second bank 220_2 may be stopped, and power may be supplied only to the third bank 220_3. Because the power supplied to the first bank 220_1 and the second bank 220_2 has stopped, the first address group ADDa and the second address group ADDb may need to be remapped to the third bank 220_3. In some implementations, when the first bank 220_1 and the second bank 220_2 are powered off, the processor 110 and the cache controller 121 may select the third hash function 213. The third hash function 213 may receive the first address group ADDa, the second address group ADDb, or the third address group ADDc and output the third target TGT3 to the third bank 220_3. In this manner, when power supplied to at least one bank is stopped, a particular address group may be remapped to a bank different from the previously mapped bank.

Although not illustrated, the processor 110 and/or the cache controller 121 may further include an arbitrator for delivering an address (or a transaction including an address) to a bank according to a target.

Figure 3:
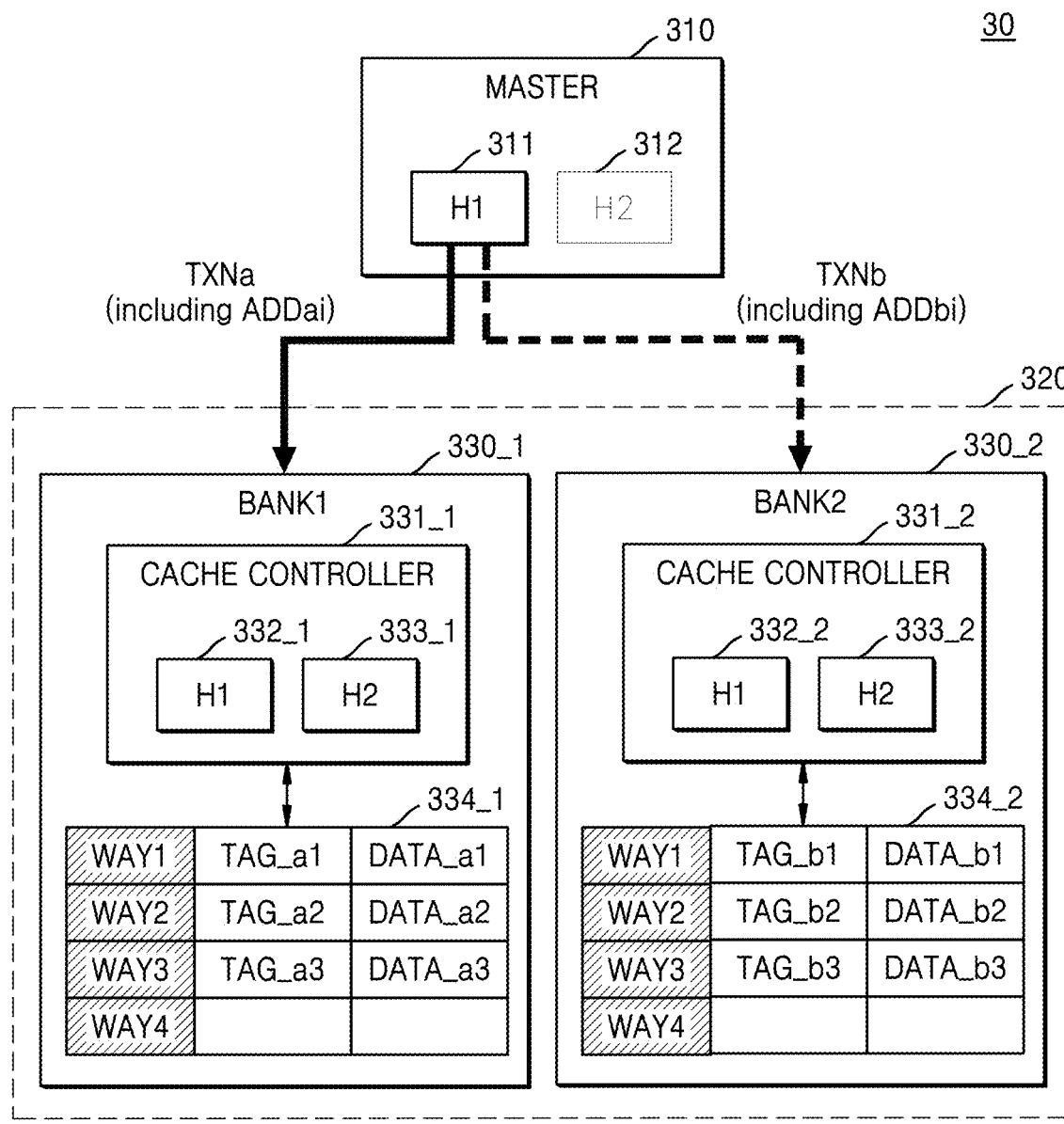
FIGS. 3 and 4 are example diagrams in which a master provides transactions.
Figure 4:
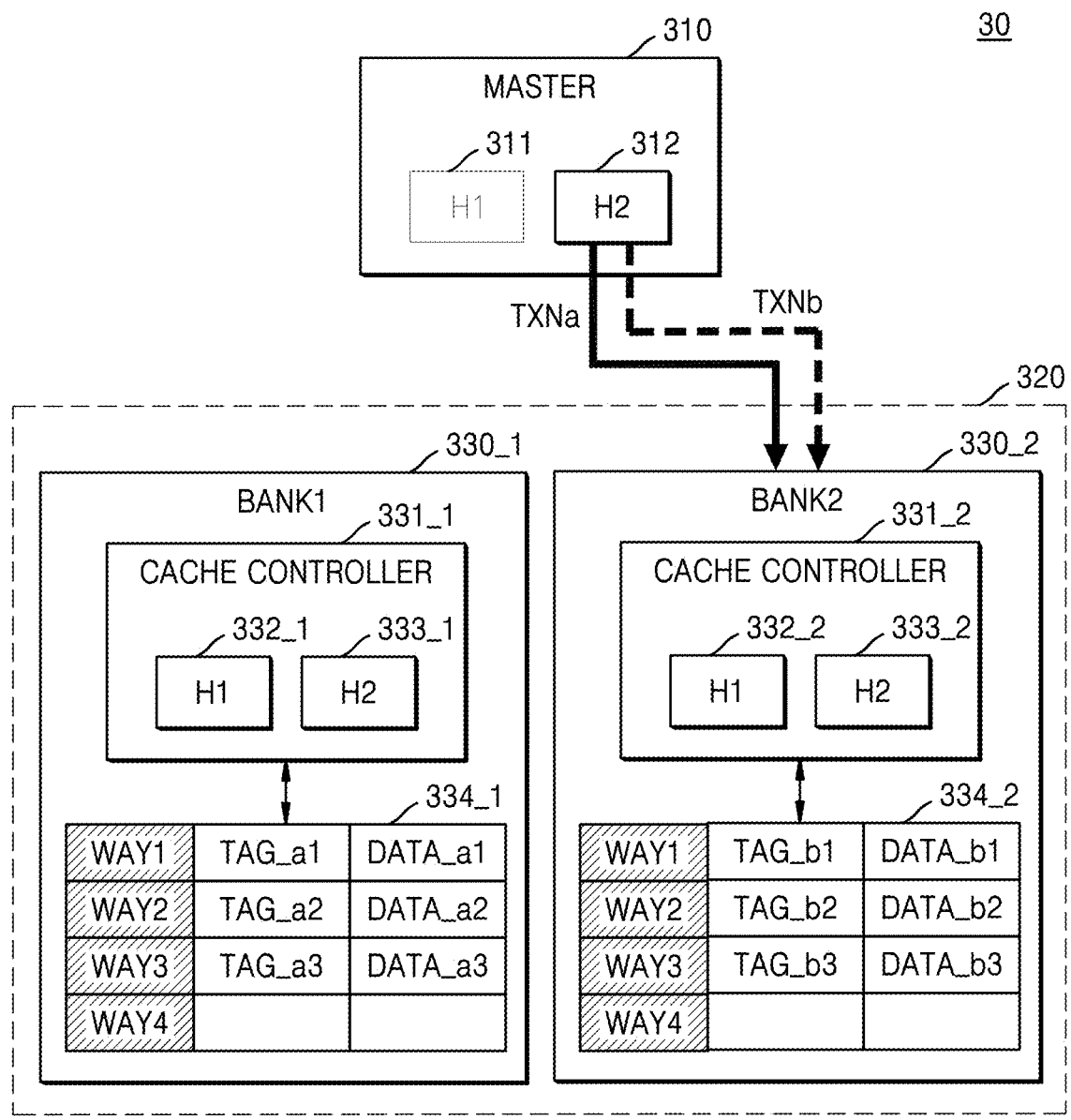

FIGS. 3 and 4 are example diagrams in which a master 310 provides transactions to a memory device 320. FIG. 3 is a diagram of a path through which a transaction is transmitted to memory device 320 when the master 310 selects the first hash function 211, and FIG. 4 is a diagram of a path through which a transaction is transmitted to a memory device 320 when the master 310 selects the second hash function 212. Hereinafter, each implementation of FIGS. 3 and 4 is described on the assumption that the respective numbers of hash functions and banks is two for convenience of description.

Referring to FIGS. 3 and 4, the master 310 included in an electronic device 30 may correspond to the processor 110 in FIG. 1. The master 310 may include a first hash function 311 and a second hash function 312. A memory device 320 included in the electronic device 30 may correspond to the memory device 120 in FIG. 1. The memory device 320 may include a first bank (first bank) 330_1 and a second bank 330_2. In FIGS. 3 and 4, the memory device 320 is illustrated as including two banks, but is not limited thereto. The first bank 330_1 may be included in the first bank group as a bank capable of stopping power supply, and the second bank 330_2 may be included in the second bank group as at least one bank designed to always supply power in a state where the memory device 320 is turned on. The master 310 may select any one hash function from a plurality of hash functions, input the address of the transaction into the selected hash function, and determine which of the first bank 330_1 and the second bank 330_2 of the memory device 320 is arbitrated with the transaction.

In some implementations, at least one of the first bank 330_1 and the second bank 330_2 may include a cache controller. For example, the first bank 330_1 may include a cache controller 331_1, and the second bank 330_2 may include a cache controller 331_2. Each cache controller may include first and second hash functions. For example, the cache controller 331_1 may include a first hash function 332_1 and a second hash function 333_1 and the cache controller 331_2 may include a first hash function 332_2 and a second hash function 333_2.

Each of the first bank 330_1 and the second bank 330_2 may include a way group. For example, the first bank 330_1 may include a way group 334_1 and the second bank 330_2 may include a way group 334_2. Each way group may include a plurality of ways. For example, each of the way group 334_1 and the way group 334_2 may include first through fourth ways way1 through way4. In FIGS. 3 and 4, each of the first bank 220_1 and the second bank 220_2 is illustrated as including four ways, but is not limited thereto. The ways of the way group 334_1 may include cachelines respectively corresponding to the first addresses included in the first address group ADDa, and the ways of the way group 334_2 may include cachelines respectively corresponding to the second addresses included in the second address group ADDb. Tags and data may be stored in each cacheline. For example, in the way group 334_1, tags TAG_a1, TAG_a2, and TAG_a3 for the first address group ADDa, and data DATA_a1, DATA_a2, and DATA_a3 may be stored. In this case, the tag TAG_a1 may indicate an address (for example, ADDa1) included in the first address group ADDa, the tag TAG_a2 may indicate an address (for example, ADDa2) included in the first address group, and the tag TAG_a3 may indicate an address (for example, ADDa3) included in the first address group. For example, in the way group 334_2, tags TAG_b1, TAG_b2, and TAG_b3 and data DATA_b1, DATA_b2, and DATA_b3 for the second address group ADDb may be stored. The tags TAG_b1, TAG_b2, and TAG_b3 may indicate second addresses (for example, ADDb1, ADDb2, and ADDb3), respectively.

Referring to FIG. 3, the master 310 may select the first hash function 311. The master 310 may arbitrate a first transaction TXNa to the first bank 330_1 by using the first hash function 311. In other words, the first transaction TXNa may be transferred to the first bank 330_1, and the first transaction TXNa may include a first address ADDai, a request, and the first target TGT1, which are arbitrary. The master 310 may arbitrate a second transaction TXNa to the second bank 330_2 by using the first hash function 311. In other words, the second transaction TXNb may be transferred to the second bank 330_2, and the second transaction TXNb may include a second address ADDbi, a request, and the second target TGT2, which are arbitrary.

Referring to FIG. 4, the master 310 may select the second hash function 312. The master 310 may transfer the first transaction TXNa to the second bank 330_2 of the memory device 320 by using the second hash function 312. Alternatively, the master 310 may transfer the second transaction TXNb to the second bank 330_2 of the memory device 320 by using the second hash function 312. A path through which the first transaction TXNa is arbitrated to a bank may be referred to as an "A path", and a path through which the second transaction TXNb is arbitrated to a bank may be referred to as a "B path".

The memory device 320 implemented as a cache memory may determine which bank to be allocated an address (or cacheline), by performing a hash functioning based on an address of a cacheline by using a request arbitration logic. Accordingly, a bank allocated according to an address pattern may be classified. To this end, each of the cache controllers 331_1 and 331_2 may include an allocation decision logic configured to determine whether to allocate an address to a bank, and a forwarding logic configured to forward a cacheline stored in a particular bank to another bank.

Figure 5:
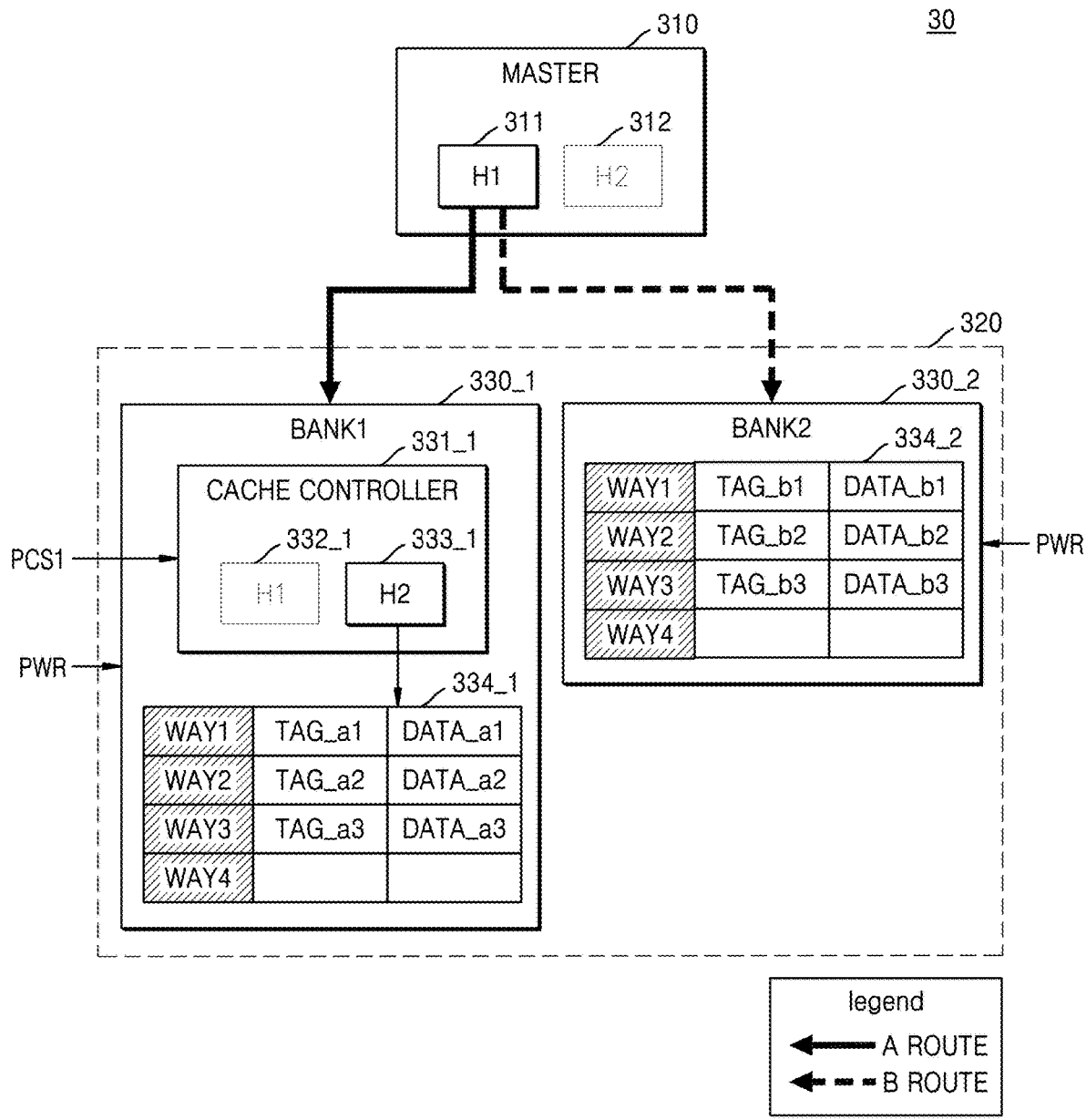
FIGS. 5, 6, and 7 are diagrams of operations of an example of an electronic device.
Figure 6:
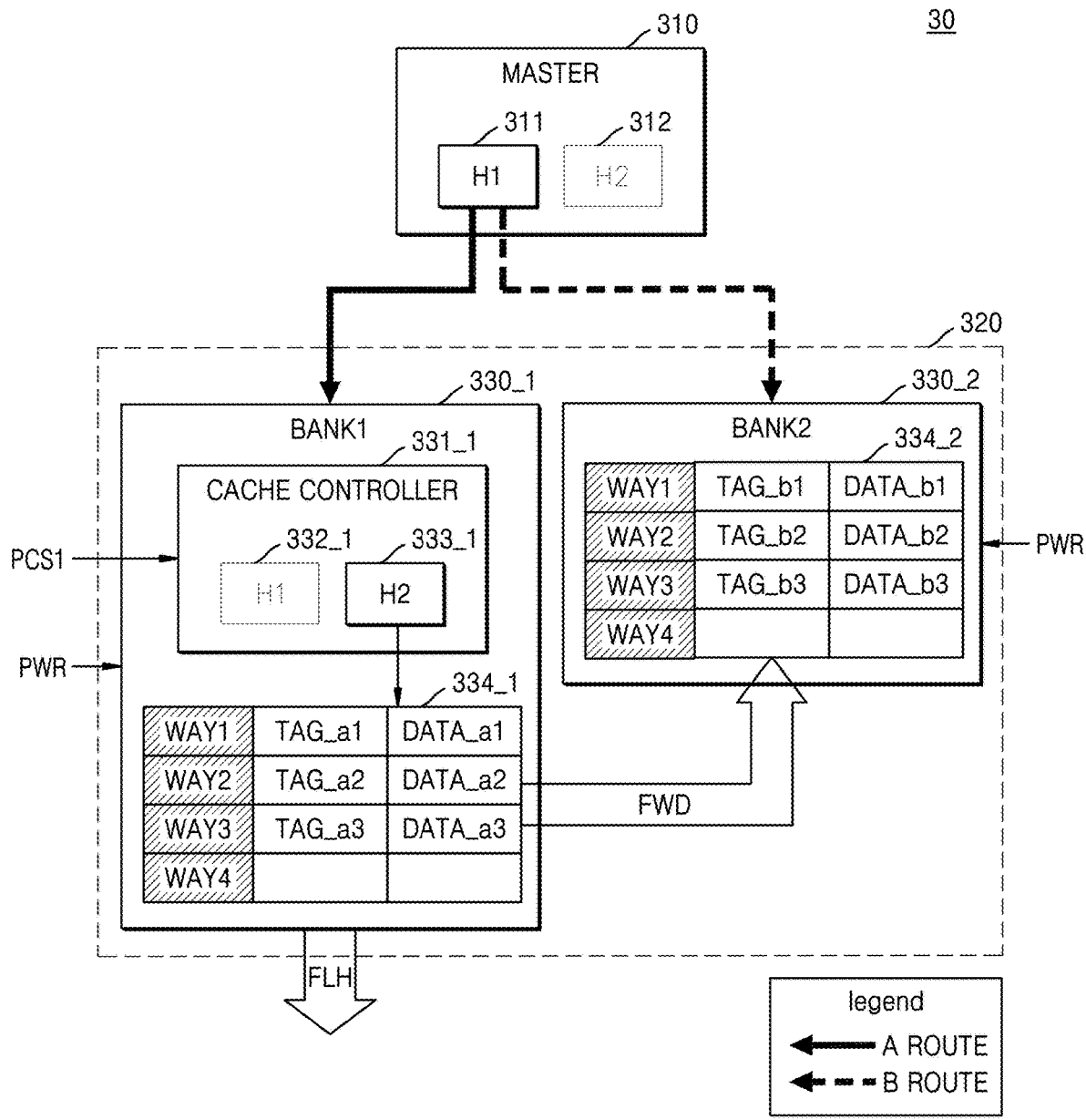
Figure 7:
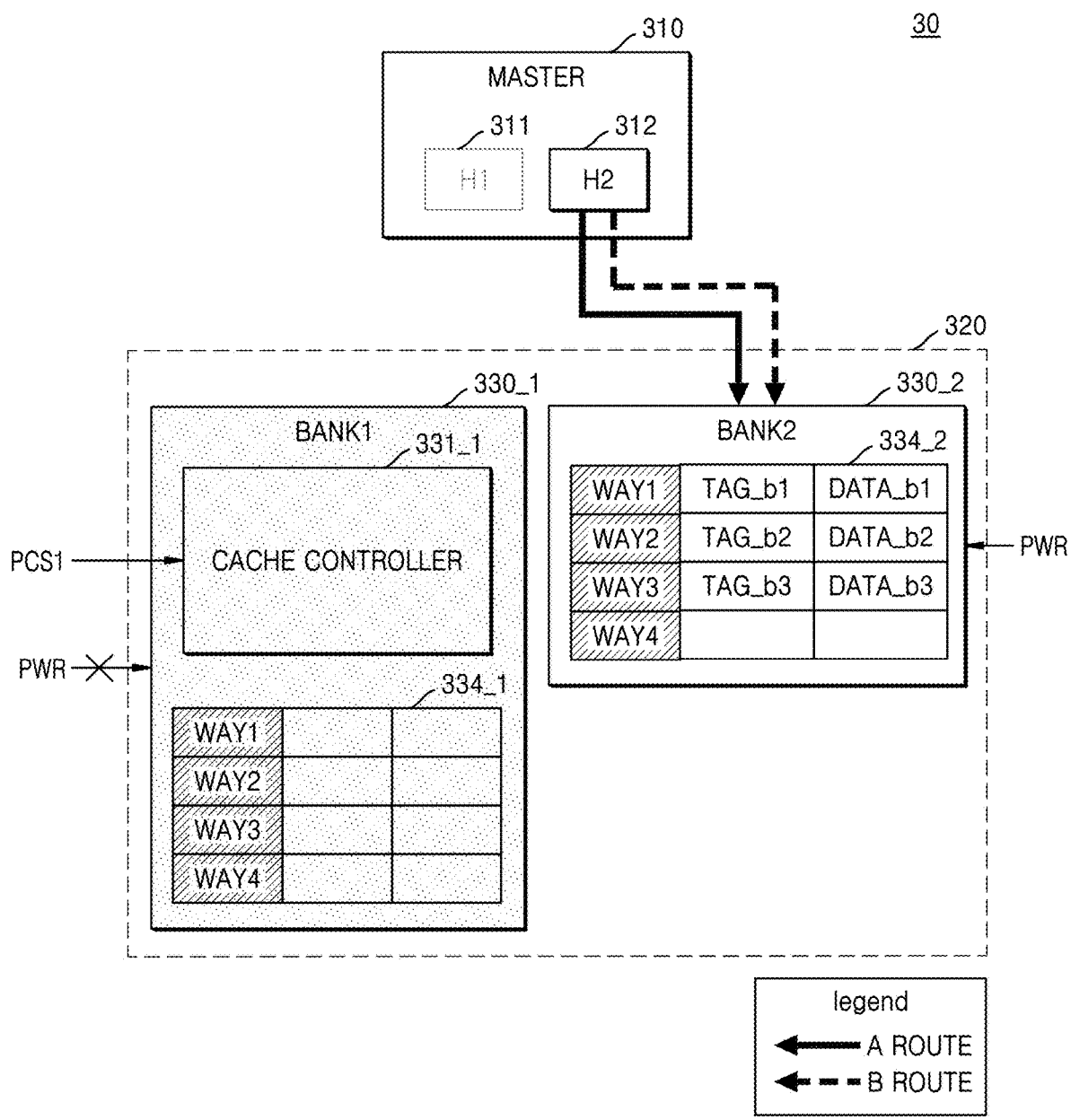

FIGS. 5, 6, and 7 are diagrams of operations of an example of an electronic device 30.

Referring to FIGS. 5, 6, and 7, the first bank 330_1 may be included in the first bank group. The first bank 330_1 may receive power PWR and store at least one cacheline corresponding to the first address group ADDa. The second bank 330_2 may be included in the second bank group. At least one cacheline corresponding to the second address group ADDb may be stored by receiving the power PWR. The cache controller 331_1 may set a hash function in response to a power control signal directing to stop supplying power to the first bank 330_1, and map the first address ADDai to the second bank 330_2, based on the hash function and the first transaction TXNa. In this case, the first transaction TXNa may be provided from the master 310 after the power control signal described above is input, and may include the first address ADDai and the first target TGT1.

Referring to FIG. 5, the master 310 may select the first hash function 311. The master 310 may output the first transaction TXNa to the memory device 320 so that the first transaction TXNa is transferred to the first bank 330_1 based on the first hash function 311. According to the first hash function 311 of the master 310, the first transaction TXNa may be transferred to the first bank 330_1 like the A path A route, and the second transaction TXNb may be transferred to the second bank 330_2 like the B path B route. On the other hand, a first power control signal PCS1 may be input to the memory device 320. The first power control signal PCS1 may be generated by the power manager 130 and may direct to stop supplying the power PWR to the first bank group. When some banks (for example, the first bank 330_1) enter the power-off mode, the hash function may be changed so that tags TAG_a1, TAG_a2, and TAG_a3 and data DATA_a1, DATA_a2, and DATA_a3 stored in the cachelines (for example, first through third ways way1, way2, and way3) previously allocated to the first bank 330_1 are allocated to a powered-on bank (for example, the second bank 330_2). For example, the cache controller 331_1 may select the second hash function 333_1 from the first hash function 332_1 and the second hash function 333_1 in response to the first power control signal PCS1. In another example, the cache controller 331_1 may change the hash function from the first hash function 332_1 to the second hash function 333_1 in response to the first power control signal PCS1. On the other hand, the master 310 may maintain the first hash function 311 for a certain period of time even after the first power control signal PCS1 is input.

Referring to FIG. 6, the cache controller 331_1 may perform a flush operation on the way group 334_1 of the first bank 330_1 by using the second hash function 333_1. The cachelines stored in the way group 334_1 may be flushed FLH. The flush operation may include an operation of reading a tag of a cacheline stored in a bank, and an operation of moving and storing data of a cacheline stored in a bank in a memory or a storage device on a lower layer than the memory device 320 by using information included in the tag. A layer of a memory may include a register, an L1 cache, an L2 cache, an L3 cache, a main memory, a secondary storage, or the like included in a processor. For example, when the memory device 320 is an L1 cache, a memory device in a lower layer than the memory device 320 may include an L2 cache, an L3 cache, or a main memory, and a storage device in a lower layer than the memory device 320 may include a secondary storage. However, the implementation is not limited thereto. The main memory may include, for example, double data rate (DDR) synchronous DRAM (SDRAM) (DDR SDRAM), low power DDR (LPDDR) SDRAM (LPDR SDRAM), graphics DDR (GDDR) SDRAM (GDDR SDRAM), rambus DRAM (RDRAM), etc. The secondary storage may correspond to a memory card, a PC card, a compact flash card, a smart media card, a memory stick, a multimedia card, a secure digital (SD) card, a universal flash memory device, a hard disk drive (HDD), a solid state disk/drive (SSD), etc.

On the other hand, while the flush operation on the first bank 330_1 is being performed, the master 310 may be running and output a transaction to the memory device 320. In other words, the cache controller 331_1 performing the flush operation may receive a transaction from the master 310. In this case, because a hash function included in the master 310 is the first hash function 311, the master 310 may provide the first transaction TXNa to the first bank 330_1. The first address group ADDa included in the first transaction TXNa may not belong to the first bank 330_1. In this case, the cache controller 331_1 may map the second bank 330_2 to the first address group ADDa, based on the second hash function 333_1 and the first address group ADDa, and perform a forwarding FWD operation on the first transaction TXNa to the second bank 330_2. In some implementations, a forwarding FWD operation may include an operation of determining whether a transaction including an address group, which no longer belongs to the powered-off bank, has a cache hit, and an operation of generating a new transaction so that a corresponding address group is transferred to a powered-on bank. For example, a first transaction TXNa including the first address ADDa3 and a first target TGT1 may be provided to the cache controller 331_1 performing the flush operation. Because the cacheline including the tag TAG_a3 and the data DATA_a3 is stored in the way group 334_1, the cache controller 331_1 may determine that the first transaction TXNa has had a cache hit. In addition, the cache controller 331_1 may output the data DATA_a3 to the master 310, in response to the cache hit. In addition, the cache controller 331_1 may input the first address ADDa3 to the second hash function 333_1 and may generate a second target TGT2 indicating the second bank 330_2. The cache controller 331_1 may generate a new transaction including a storage request instructing to store a cacheline, wherein the first address ADDa3, the second target TGT2, and the tag TAG_a3 and the data DATA_a3 are included. A transaction generated by the cache controller 331_1 may be referred to as an internal transaction. The cache controller 331_1 may provide the internal transaction to the master 310, or perform the forwarding FWD operation on the internal transaction to the second bank 330_2. On the other hand, the cache controller 331_1 may invalidate the cacheline (for example, the tag TAG_a3 and the data DATA_a3) stored in a third way way3 of the way group 334_1. As another example, the first transaction TXNa including the first address ADDa4 and the first target TGT1 may be provided to the cache controller 331_1 performing the flush operation. Because the cacheline corresponding to the first address ADDa4 is not stored in the way group 334_1, the cache controller 331_1 may determine that the first transaction TXNa has been a cache miss. In addition, the cache controller 331_1 may input the first address ADDa4 to the second hash function 333_1 and may generate the second target TGT2. The cache controller 331_1 may change the first target TGT1 included in the first transaction TXNa to the second target TGT2. The cache controller 331_1 may provide an internal transaction including the first address ADDa4 and the second target TGT2 to the master 310, or perform the forwarding FWD operation on the internal transaction to the second bank 330_2 so that the first address ADDa4 and the second bank 330_2 are remapped or redirected.

When the flush operation is completed, information updated by the cachelines stored in the way group 334_1 may be stored in a memory or a storage device in a lower layer. When information included in a tag is not updated due to necessity, an operation of storing data of a cacheline on a memory or a storage device in a lower layer may also be omitted.

Referring to FIG. 7, when the flush operation is completed, the cache controller 331_1 may output a response signal to the master 310. In this case, a response signal may be a signal notifying that a hash function already selected from among a plurality of hash functions included in the master 310 is changed to another hash function. The master 310 may receive a response signal from the cache controller 331_1 and may change a hash function from the first hash function 311 to the second hash function 312 in response to the response signal. On the other hand, the supply of the power PWR to the first bank 330_1 may be stopped.

In some implementations, the cache controller 331_2 may be disabled in advance to terminate the forwarding FWD operation before the supply of the power PWR to the first bank 330_1 is stopped. In this case, the time of the forwarding FWD operation may be reduced. However, the implementation is not limited thereto, and when the supply of the power PWR to the first bank 330_1 is stopped, the cache controller 331_2 may also be disabled.

On the other hand, when the bank 330_1, which had previously been powered off, is powered on again, the second hash function 312 may be changed (or restored) to the first hash function 311. In this case, a normal operation may be ensured only when the cachelines to be allocated to the first bank 330_1, which has been powered on again, among the cachelines allocated to the second bank 330_2, which has already been powered on, are flushed FLH or migrated to the first bank 330_1. Hereinafter, implementations of operations of the electronic device 30 are described for the case where the first bank 330_1, which had previously been powered off, is powered on again.

Figure 8:
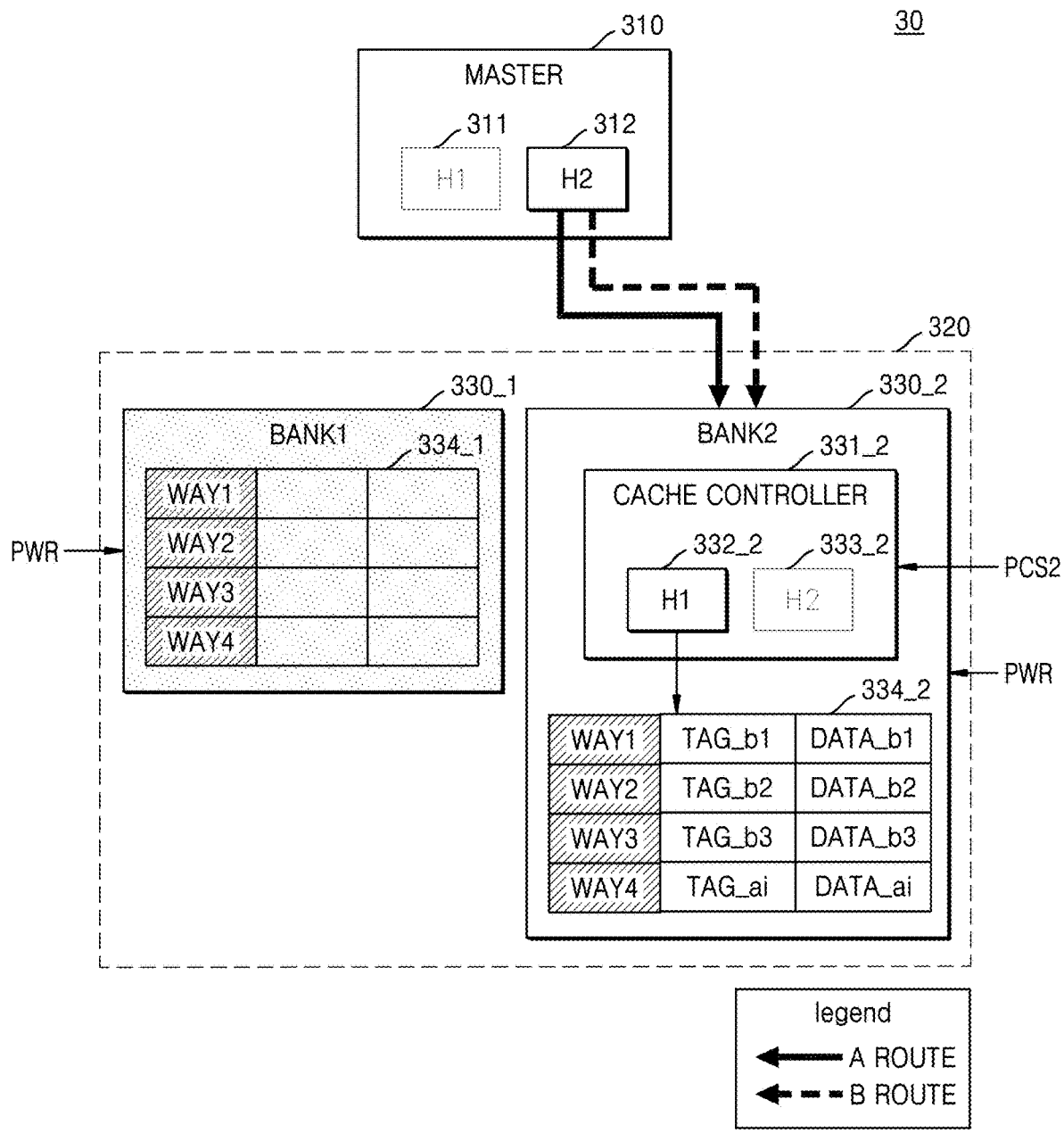
FIGS. 8, 9, and 10 are diagrams of operations of an example of an electronic device.
Figure 9:
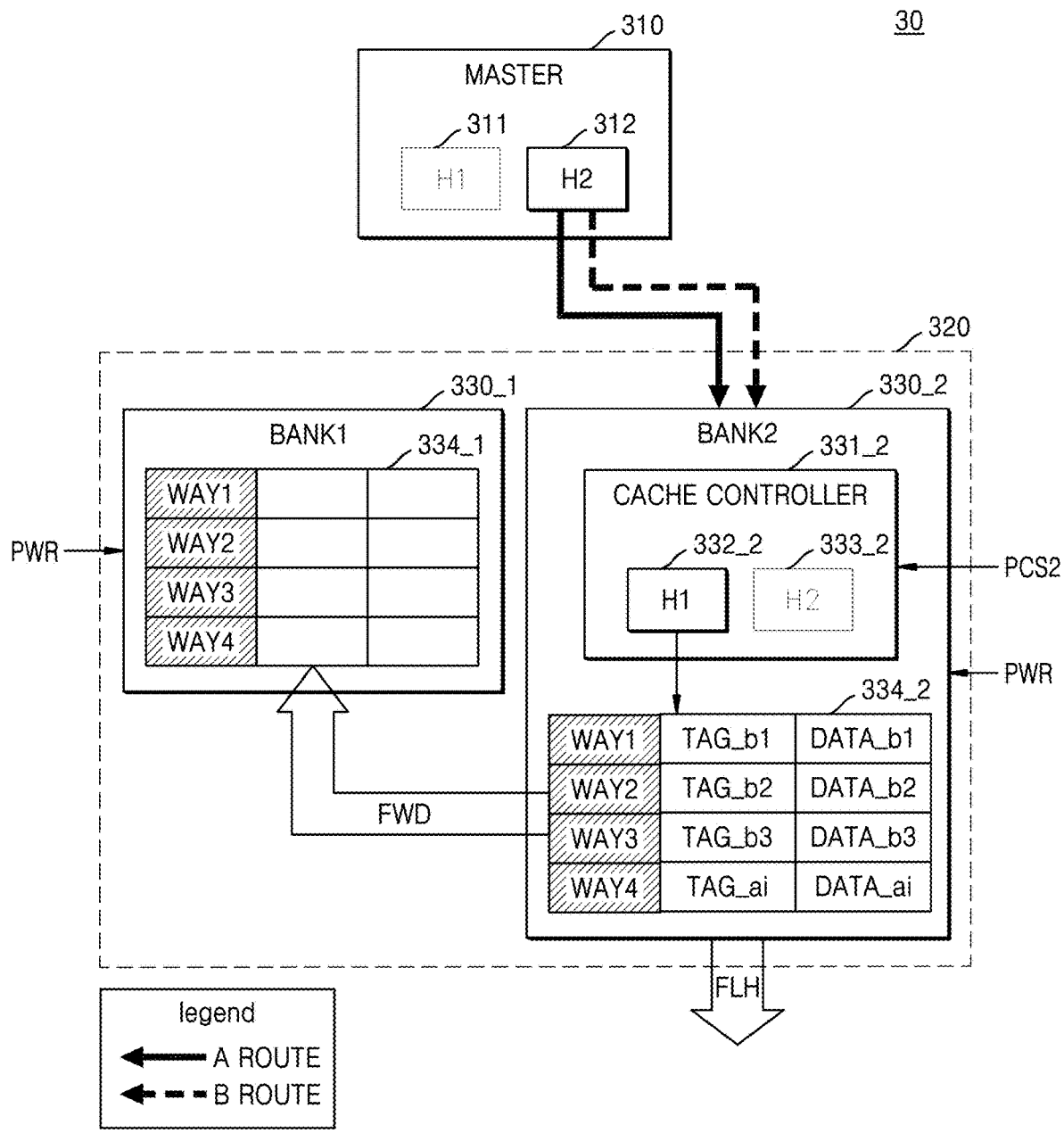
Figure 10:
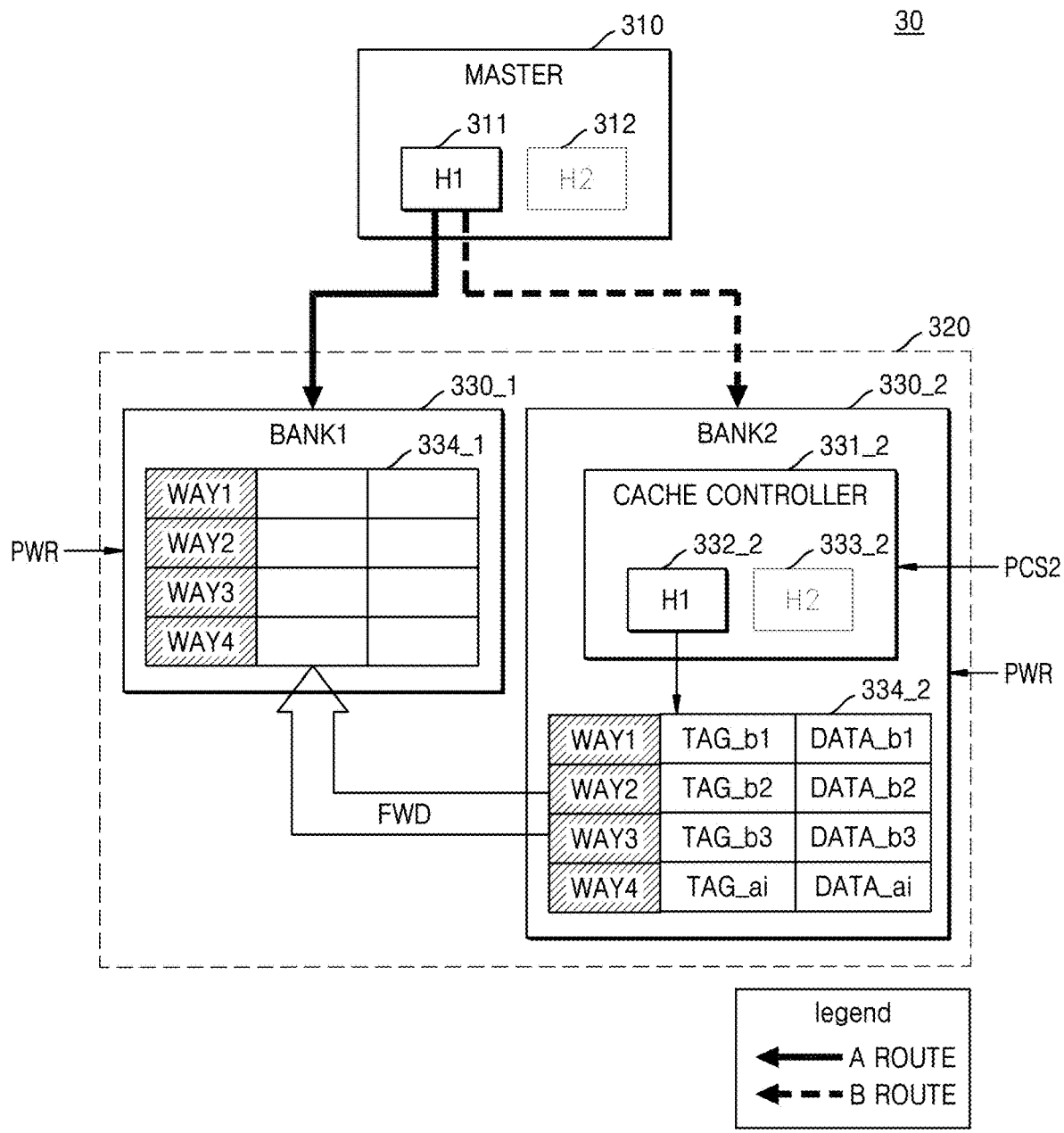

FIGS. 8, 9, and 10 are diagrams of operations of an example of an electronic device 30.

Referring to FIGS. 8, 9, and 10, the first bank 330_1 included in the first bank group may receive power PWR in response to the power control signal instructing to supply the power PWR. The second bank 330_2 included in the second bank group may receive power PWR and may store at least one first cacheline and at least one second cacheline. The first cacheline may correspond to the first address group ADDa, and the second cacheline may correspond to the second address group ADDb. The cache controller 331_2 may set a hash function in response to the power control signal and may map the first address ADDai to the second bank 330_2, based on the hash function and the first transaction TXNa. In this case, the first transaction TXNa may be provided by the master 310 after the power control signal described above is input, and may include the first address ADDai and the second target TGT2.

Referring to FIGS. 7 and 8, while the first bank 330_1 is powered off, the first transaction TXNa or the second transaction TXNb may be transferred to the second bank 330_2 according to the second hash function 312 of the master 310. The second bank 330_2 may include the cache controller 331_2 and the way group 334_2. The way group 334_2 may include the first cacheline corresponding to the first address (or mapped), and the second cacheline corresponding to the second address. Each of the first cacheline and the second cacheline may be one or more. For example, the first cacheline may be stored in the fourth way way4 of the way group 334_2. Each of the second cachelines may be stored in each of the first through third ways way1, way2, and way3 of the way group 334_2. In this case, a tag TAG_ai included in the first cacheline may include information about an arbitrary first address ADDai. The tags TAG_b1, TAG_b2, and TAG_b3 included in the second cachelines may include information about the second addresses (for example, ADDb1, ADDb2, and ADDb3) included in the second address group ADDb.

On the other hand, the power PWR may be supplied to the first bank 330_1, which is powered off. In this case, according to some implementations, the memory device 320 may be internally initialized. After the initialization is completed, a second power control signal PCS2 may be input to the memory device 320. The second power control signal PCS2 may be generated by the power manager 130 and may direct to supply the power PWR to the first bank group. The cache controller 331_2 included in the second bank 330_2 may select the first hash function 332_2 from the first hash function 332_2 and the second hash function 333_2 in response to the second power control signal PCS2. For example, the cache controller 331_2 may change the hash function from the second hash function 333_2 to the first hash function 332_2 in response to the second power control signal PCS2. On the other hand, the master 310 may maintain the second hash function 312 for a certain period of time, even after the second power control signal PCS2 is input. Although not illustrated, the cache controller 331_1 of the first bank 330_1 may also change the hash function from the second hash function 333_1 to the first hash function 332_1.

Referring to FIG. 9, the cache controller 331_2 may perform the flush operation on the way group 334_1 of the second bank 330_2 by using the first hash function 332_2. The cachelines stored in the way group 334_2 may be flushed FLH. In some implementations, at least one first cacheline stored in the way group 334_2 may be flushed FLH. In addition, in some implementations, the cache controller 331_2 may perform a flush operation only on the cachelines having a tag TAG_ai for the first address group ADDa, which no longer belongs to the second bank 330_2, by using the first hash function 332_2 among the cachelines stored in the way group 334_2, but is not limited thereto.

On the other hand, while the flush operation on the second bank 330_2 is being performed, the master 310 may be running and output a transaction to the memory device 320. In other words, the cache controller 331_2 performing the flush operation may receive a transaction from the master 310. In this case, the master 310 may provide the first transaction TXNa to the second bank 330_2. The first address group ADDa included in the first transaction TXNa may no longer belong to the second bank 330_2. In this case, the cache controller 331_2 may map the first bank 330_1 to the first address group ADDai, based on the first hash function 332_2 and the first address group ADDa, and perform a forwarding FWD operation on the first transaction TXNa to the first bank 330_1. For example, when the first transaction TXNa provided to the cache controller 331_2 performing the flush operation has a cache hit, the cache controller 331_2 may output data DATA_ai to the master 310, and the cache controller 331_2, may generate an internal transaction for storing the first cacheline in the first bank 330_1, and provide the internal transaction to the master 310. The internal transaction may include a storage request instructing to store the first address ADDai, the first target TGT1, and the first cacheline, which are indicated by the tag TAG_ai. The first target TGT1 may be generated from the first address of the first transaction TXNa and the first hash function 332_2. The cache controller 331_2 may invalidate the first cacheline. When the first transaction TXNa is a cache miss, the cache controller 331_2 may generate a first target TGT1 based on the first hash function 332_2 and the first address of the first transaction TXNa, and may provide an internal transaction including the first address and the first target TGT1 to the master 310 or perform a forwarding FWD operation on the internal transaction to the first bank 330_1 so that the corresponding first address is redirected to the first bank 330_1.

Referring to FIG. 10, when the flush operation is completed, the cache controller 331_2 may output a response signal to the master 310, and the master 310 may change the hash function from the second hash function 312 to the first hash function 311 in response to the response signal. In some implementations, when the master 310 changes the second hash function 312 to the first hash function 311, the cache controller 331_2 may be disabled to terminate the forwarding FWD operation. In this case, the time of the forwarding FWD operation may be reduced. However, the implementation is not limited thereto, and the cache controller 331_2 may also maintain an enable state even after the master 310 changes the hash function.

Figure 11:
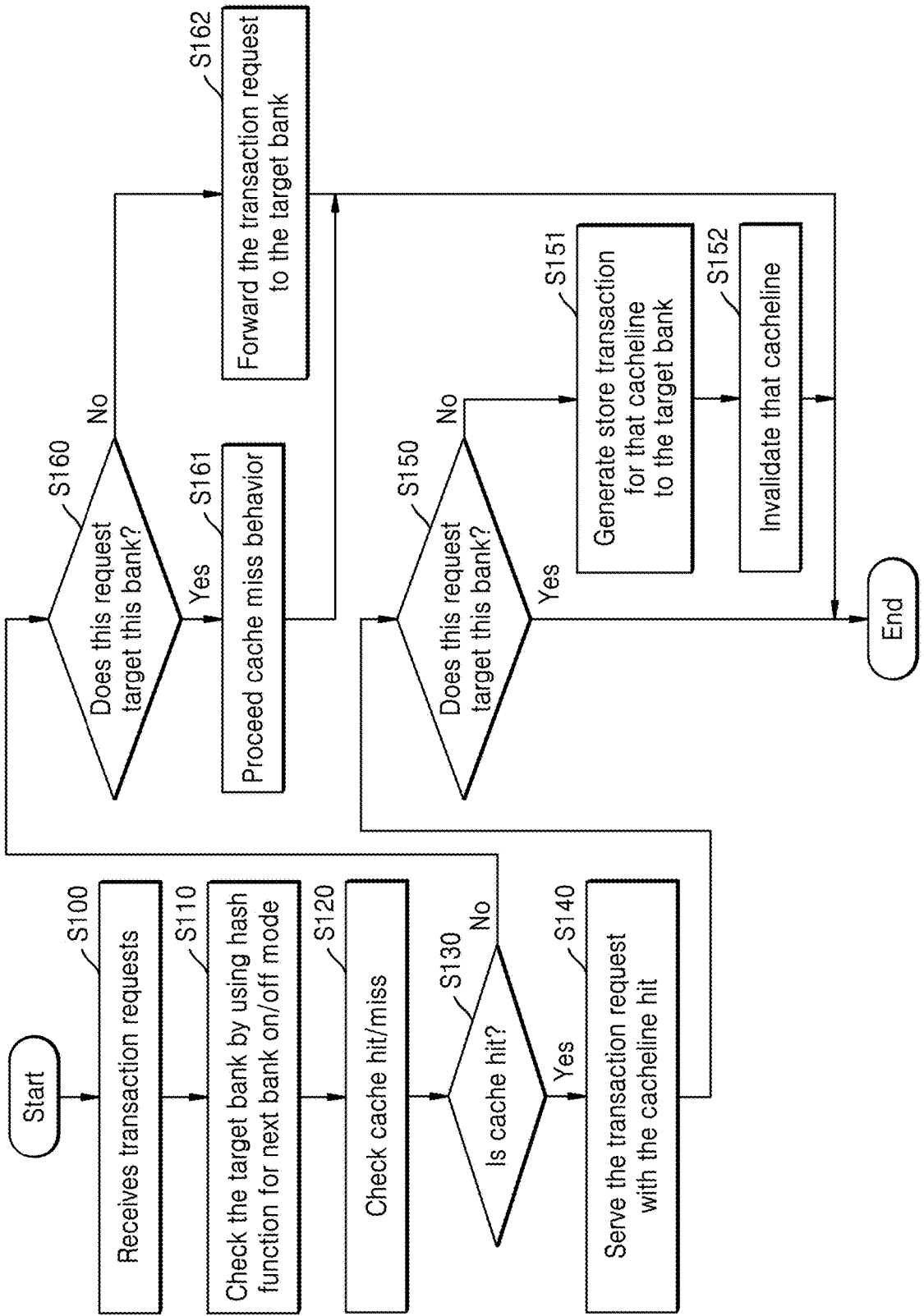
FIG. 11 is a flowchart of an example of a forwarding operation of a memory.

FIG. 11 is a flowchart of an example of the forwarding FWD operation of a memory device 320.

Referring to FIG. 11, in operation S100, the memory device 320 may receive transaction requests from the master 310. In some implementations, a transaction request may include a read request, a target, and an address.

In operation S110, the memory device 320 may check a target bank by using a hash function for a next bank on/off mode. For example, the cache controller 331_1 or 331_2 may set a hash function by changing the hash function in response to the power control signal. In addition, the cache controller 331_1 or 331_2 may check the target bank by inputting the address to the changed hash function and generating a target indicating a particular bank.

In operation S120, the memory device 320 may check a cache hit/miss. For example, the cache controller 331_1 or

331_2 may read the cachelines of the way group 334_1 or 344_2 and determine whether a cache is hit or missed by using the tags and addresses of the cachelines. In operation S130, the memory device 320 may determine whether a transaction request has a cache hit. Referring to FIG. 6, for example, the cache controller 331_1 may determine whether the first transaction TXNa for the at least one cacheline stored in the first bank 330_1 has a cache hit and may respond to the first transaction TXNa according to the result of the determination of the cache hit. Referring to FIG. 9, for example, the cache controller 331_2 may determine whether the first transaction TXNa for the at least one first cacheline stored in the second bank 330_2 has a cache hit and may respond to the first transaction TXNa according to the result of the determination of the cache hit.

When a cache is hit (Yes in operation S130), in operation S140, the memory device 320 may serve the transaction request with the cacheline hit. Referring to FIG. 6, for example, the cache controller 331_1 may output the cache hit cacheline (for example, data of the cacheline) to the master 310. Referring to FIG. 9, for example, the cache controller 331_2 may output the cache hit cacheline to the master 310.

In operation S150, the memory device 320 determines whether the corresponding request (for example, a transaction request) corresponds to a bank including the cache controller 331_1 or 331_2. Referring to FIG. 6, for example, the cache controller 331_1 may determine whether the target generated in operation S110 matches a first reference target. The first reference target may be pre-stored in the cache controller 331_1. In this case, the first reference target may be the first target TGT1. Referring to FIG. 9, for example, the cache controller 331_2 may determine whether the target generated in operation S110 matches a second reference target. The second reference target may be pre-stored in the cache controller 331_2. In this case, the first reference target may be the second target TGT2. When the generated target matches the second reference target (Yes in operation S150), the operation may be terminated. When the generated target is different from the second reference target (No in operation S150), the memory device 320 may generate a storage transaction for storing the corresponding cacheline in the target bank. Referring to FIG. 6, for example, the cache controller 331_1 may output, to the master 310, a first internal transaction including the first address ADDai, the second target TGT2, and a storage request to the master 310. Referring to FIG. 9, for example, the cache controller 331_2 may output, to the master 310, the first internal transaction including the first address ADDai, the first target TGT1, and the storage request to the master 310. In operation S152, the memory device 320 may invalidate the corresponding cacheline. Referring to FIG. 6, for example, the cache controller 331_1 may invalidate a cache hit cacheline (for example, the tag TAG_a3 and the data DATA_a3). Referring to FIG. 9, for example, the cache controller 331_2 may invalidate a cache hit cacheline (for example, the tag TAG_ai and data DATA_ai) that is cache hit and stored in the second bank 330_2.

When a cache miss occurs (No in operation S130), in operation S160, the memory device 320 may determine whether the corresponding request (for example, the transaction request) corresponds to a bank including the cache controller 331_1 or 331_2. In other words, the operation in operation S160 may be the same as the operation in operation S150.

When the generated target matches the second reference target (Yes in operation S160), the memory device 320 may proceed with a cache miss procedure. For example, the cache controller 331_1 or 331_2 may select a victim line from all of the ways. When a cache miss occurs, the victim line may be a cacheline for storing data stored in a memory or storage in a lower layer. The cache controller 331_1 or 331_2 may perform storing data stored in a memory or storage of a lower layer in a selected victim line or the like.

When the generated target is different from the second reference target (No in operation S160), the transaction request may be forwarded to the target bank. Referring to FIG. 6, for example, the cache controller 331_1 may change the target from the first target TGT1 to the second target TGT2 by using the second hash function 333_1 and may output, to the master 310, the second internal transaction including the changed target (for example, the second target TGT2) and the first address ADDai to the master 310. Referring to FIG. 9, for example, the cache controller 331_2 may change the target from the second target TGT2 to the first target TGT1 by using the first hash function 332_2 and may output, to the master 310, the second internal transaction including the first target TGT1 and the first address ADDai to the master 310.

Figure 12:
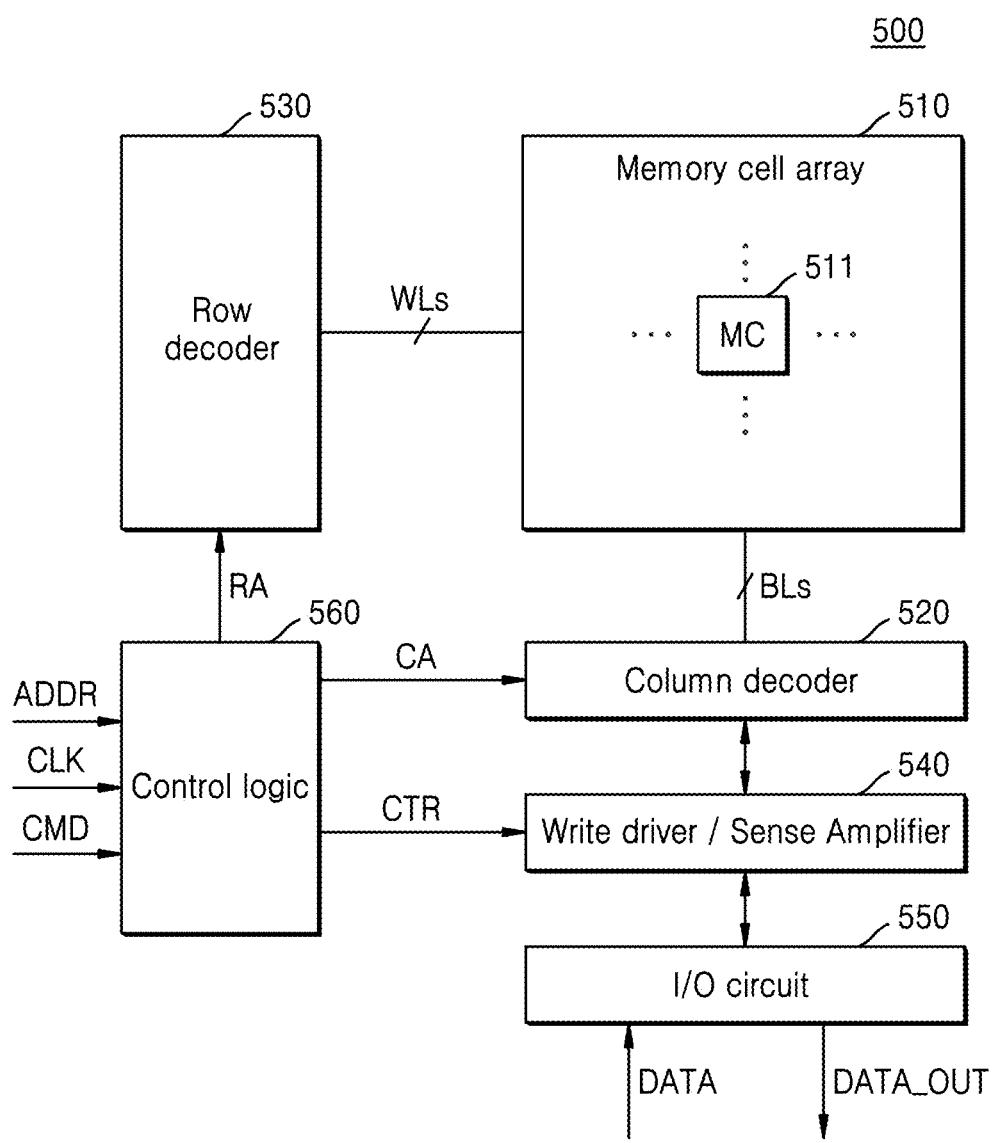
FIG. 12 is a block diagram of an example of a bank.

FIG. 12 is a block diagram of an example of a bank 500.

Referring to FIG. 12, the bank 500 may, during a write operation, receive a command CMD, an address ADDR, a clock CLK, and input data DATA_IN. For example, the bank 500 may receive the command CMD indicating a write operation, the address ADDR, and the input data DATA_IN and store the input data DATA_IN in a memory cell area corresponding to the address ADDR in a memory cell array 510. The bank 500 may, during a read operation, receive the command CMD, the address ADDR, and the clock CLK. For example, the bank 500 may receive the command CMD and the address ADDR indicating a read operation, may read data stored in the memory cell area corresponding to the address ADDR, and may output the read data to the outside as output data DATA_OUT.

In some implementations, the bank 500 may include the memory cell array 510, a column decoder 520, a row decoder 530, a write driver/sense amplifier 540, an input/output (I/O) circuit 550, and a control logic 560.

The memory cell array 510 may include a plurality of memory cells (MC) 511. The plurality of MCs 511 may be arranged at points where the word lines WL and the bit lines BL cross each other. The column decoder 520 may select at least one bit line BL from among a plurality of bit lines BL based on a column address CA. The row decoder 530 may activate at least one word line WL among a plurality of word lines WL based on a row address RA. In other words, the row decoder 530 may select at least one word line WL from among the plurality of word lines WL.

The write driver/sense amplifier 540 may, during the write operation, transfer the input data DATA_IN delivered by the I/O circuit 550 to the column decoder 520. Alternatively, the write driver/sense amplifier 540 may, during the read operation, amplify data transferred by the column decoder 520, and transfer the output data DATA_OUT to the I/O circuit 550. The I/O circuit 550 may transfer the input data DATA_IN to the write driver/sense amplifier 540. Alternatively, the I/O circuit 550 may output the output data DATA_OUT transferred by the write driver/sense amplifier 540.

The control logic 560 may receive the command CMD, the address ADDR, and the clock CLK, and generate the row address RA, the column address CA, and a control signal CTR. For example, the control logic 560 may identify a read command by decoding the command CMD, and to read the output data DATA_OUT from the memory cell array 510, may generate the row address RA, the column address CA, and the control signal CTR. In addition, the control logic 560 may identify a write command by decoding the command CMD, and to write the input data DATA_IN to the memory cell array 510, may generate the row address RA, the column address CA, and the control signal CTR.

Figure 13:
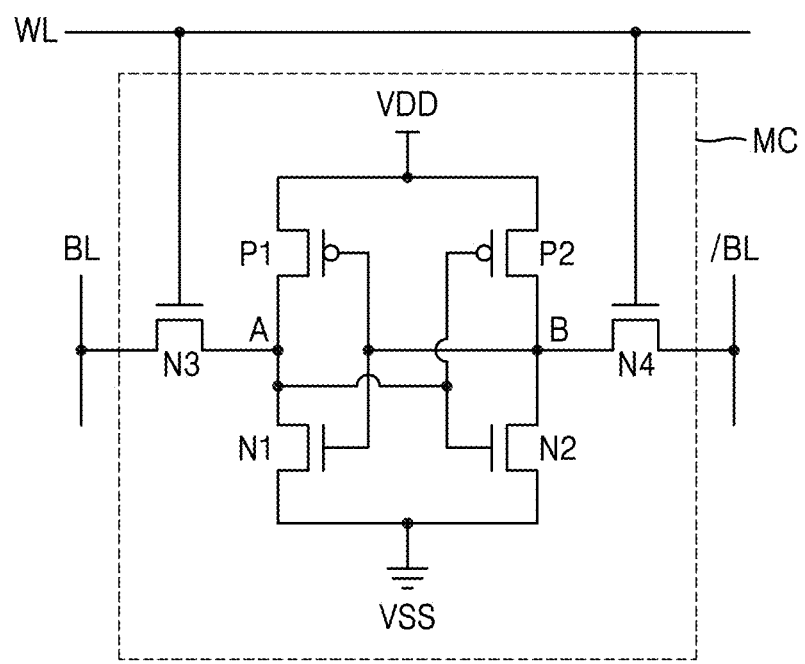
FIG. 13 is a circuit diagram of an example of a memory cell.

FIG. 13 is a circuit diagram of an example of the memory cell MC.

Referring to FIG. 13, when the bank 500 is included in SRAM, the memory cell MC may be an SRAM cell including six transistors. The memory cell MC may be referred to as a 6T SRAM cell. The memory cell MC may include first and second p-channel (P) metal-oxide-semiconductor (MOS) (PMOS) transistors P1 and P2 and first through fourth n-channel (N) metal-oxide-semiconductor (MOS) first NMOS transistor (NMOS) transistors N1 through N4. The first and second PMOS transistors P1 and P2 may be connected between the power supply voltage VDD line and the first node A and the second node B, respectively. The first and second NMOS transistors N1 and N2 may be connected between the ground voltage VSS line and the first node A and the second node B, respectively. The first node A may be connected to a gate of each of the second PMOS transistor P2 and the second NMOS transistor N2. The second node B may be connected to a gate of each of the first PMOS transistor P1 and the first NMOS transistor N1. The first node A and the second node B may be connected to the bit line BL and a complementary bit line/BL via third and fourth NMOS transistors N3 and N4, respectively. Gates of the third and fourth NMOS transistors N3 and N4 may be connected to the word line WL. The third and fourth NMOS transistors N3 and N4 may be referred to as access transistors or pass transistors. The memory cell MC may store data and complementary data at the first node A and the second node B, and may maintain a latched state of them. When the word line WL is enabled in a write operation, data and complementary data transferred to the bit line BL and the complementary bit line/BL via the third and fourth NMOS transistors N3 and N4 may be latched at the first node A and the second node B. On the other hand, in the memory cell MC, when the word line WL is enabled in a read operation, data latched at the first node A and the second node B may be transferred to the bit line BL and the complementary bit line/BL via the third and fourth NMOS transistors N3 and N4. In some implementations, the memory cell MC may include a first inverter and a second inverter. The first inverter may include the first PMOS transistor P1 and the first NMOS transistor N1. The second inverter may include the second PMOS transistor P2 and the second NMOS transistor N2.

Figure 14:
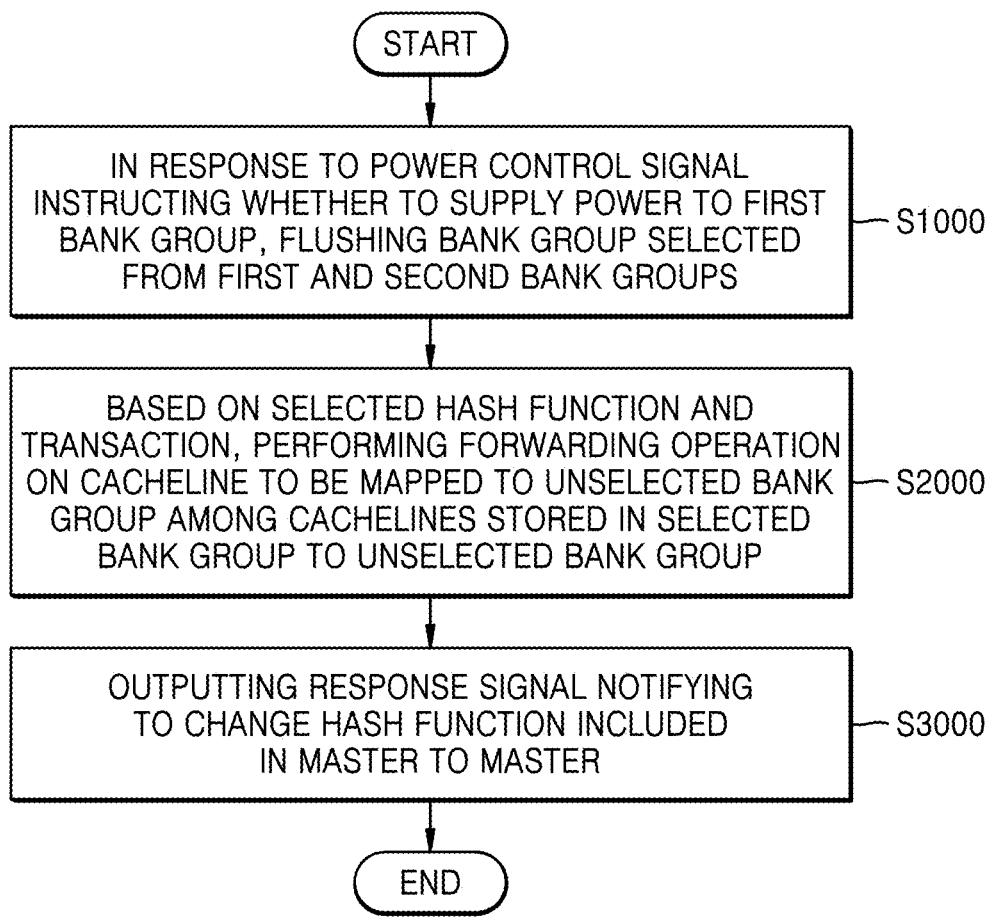
FIG. 14 is a flowchart of an example of an operating method of a memory device.

FIG. 14 is a flowchart of an example of an operating method of a memory device 120.

Referring to FIGS. 1 and 14, an operating method of the memory device 120 may include operations S1000, S2000, and S3000.

In operation S1000, in response to a power control signal instructing whether to supply power to the first bank group (for example, the first bank 122_1), the cache controller 121 may flush cachelines stored in a bank group selected from the first bank group and the second bank group (for example, the second bank 122_2). An implementation of operation S1000 may correspond to the implementation illustrated in each of FIGS. 5 and 8.

In some implementations of operation S1000, operation S1000 may include receiving the first power control signal PCS1, and flushing the first bank group as a selected bank group in response to the first power control signal PCS1.

In some implementations of operation S1000, operation S1000 may include receiving a second power control signal instructing to supply power to the first bank group, and flushing the second bank group as the selected bank group in response to the second power control signal PCS2.

In operation S2000, the cache controller 121 may perform a forwarding FWD operation on a cacheline to be mapped to an unselected bank group among the cachelines stored in the selected bank group to the unselected bank group, based on a hash function selected according to the power control signal among a plurality of different hash functions and a transaction provided by a master. An implementation of operation S2000 may correspond to the implementation illustrated in each of FIGS. 6 and 9.

In some implementations of operation S2000, operation S2000 may include selecting a hash function outputting a second target indicating a second bank group from an address of the transaction among the plurality of hash functions, determining whether the transaction is cache hit with respect to the cacheline stored in the first bank group, based on the hash function and the address of the transaction, and transferring the cache hit cacheline to the second bank group.

In some implementations of operation S2000, operation S2000 may include selecting a hash function outputting a first target indicating the first bank group from a first address group among the plurality of hash functions and a second target indicating the second bank group from a second address group, determining whether the transaction is cache hit with respect to the cacheline stored in the second bank group, based on the hash function and an address of the transaction, and transferring the cache hit cacheline to the first bank group.

In operation S3000, the cache controller 121 may output a response signal to the master for notifying that the hash function of the master (for example, the processor 110) is to be changed.

In some implementations of operation S3000, after the flush operation is completed, the cache controller 121 may output a first response signal notifying that the hash function among a plurality of hash functions included in the master is to be changed.

In some implementations of operation S3000, after the flush operation is completed, the cache controller 121 may output a second response signal notifying that the hash function among a plurality of hash functions included in the master is to be changed.

It will be clearly understood by the one of ordinary skill in the art that the structure of the present disclosure may be variously modified or changed without departing from the scope or the technical idea of the present disclosure. Considering the descriptions given above, when the modifications and changes to the present disclosure fall within the scope of the claims and equivalents below, it will be considered that the present disclosure includes the modifications and changes to the present disclosure.

While this specification contains many specific implementation details, these should not be construed as limitations on the scope of any invention or on the scope of what may be claimed, but rather as descriptions of features that may be specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a combination can in some cases be excised from the combination, and the combination may be directed to a subcombination or variation of a subcombination.

While the present disclosure has been shown and described with reference to implementations thereof, it will be understood that various change in form and details may be made therein without departing from the spirit and scope of the following claims.

What is claimed is:

1. A memory device comprising:
a first bank configured to
receive power, and
store at least one cacheline corresponding to a first address group;
a second bank configured to
receive the power, and
store at least one cacheline corresponding to a second address group; and
a cache controller configured to
set a hash function based on a power control signal that comprises instructions to suspend supply of the power to the first bank, and
based on the hash function, a first address provided by a master after the power control signal is input, and a first transaction including a first target indicating the first bank, map the first address and the second bank.

2. The memory device of claim 1, wherein the cache controller comprises:
a first hash function configured to
output the first target based on the first address group, and
output a second target indicating the second bank based on the second address group; and
a second hash function configured to output the second target based on the first address group and the second address group,
wherein the cache controller is configured to change, based on the power control signal, from the first hash function to the second hash function.

3. The memory device of claim 1, wherein the cache controller is configured to
determine whether the first transaction is a cache hit with respect to the at least one cacheline stored in the first bank, and
respond to the first transaction according to a result of the cache hit.

4. The memory device of claim 3, wherein the cache controller is configured to
based on the cache hit occurring, provide, to the master, a cacheline corresponding to the first transaction,
provide, to the master, a second target indicating the second bank, a storage request instructing to store the cacheline, and a first internal transaction comprising the first address, or forward, to the second bank, the second target, the storage request, and the first internal transaction, and
control the first bank to invalidate the cacheline stored in the first bank.

5. The memory device of claim 1, wherein the cache controller is configured to
based on a cache miss occurring, change the first target to a second target, the second target indicating the second bank, and
provide, to the master, a second internal transaction, the second internal transaction comprising the second target and the first address, or forward the second internal transaction to the second bank.

6. The memory device of claim 1, wherein the cache controller is configured to
control the first bank to perform a flush operation that flushes the at least one cacheline stored in the first bank, and
based on the flush operation on the first bank being performed, receive the first transaction.

7. The memory device of claim 6, wherein the cache controller is configured to
based on the flush operation being completed, provide, to the master, a response signal notifying to change a hash function comprised in the master.

8. The memory device of claim 1, wherein the cache controller is comprised in the first bank.

9. A memory device comprising:
a first bank configured to receive power based on a power control signal that comprises instructions to supply the power;
a second bank configured to
store at least one first cacheline corresponding to a first address group, the first address group being provided before the first bank receives the power, and
store at least one second cacheline corresponding to a second address group; and
a cache controller configured to
set a hash function based on the power control signal, and
based on the hash function, a first address provided by a master after the power control signal is input, and a first transaction including a second target indicating the second bank, map the first address to the first bank.

10. The memory device of claim 9, wherein the cache controller comprises:
a first hash function configured to
output a first target indicating the first bank based on the first address group, and
output the second target based on the second address group; and
a second hash function configured to output the second target based on the first address group and the second address group,
wherein the cache controller is configured to change, based on the power control signal, from the second hash function to the first hash function.

11. The memory device of claim 9, wherein the cache controller is configured to
determine whether the first transaction is a cache hit with respect to the at least one first cacheline, and
respond to the first transaction according to a result of the cache hit.

12. The memory device of claim 11, wherein the cache controller is configured to
based on the cache hit occurring, provide, to the master, a first cacheline corresponding to the first transaction,
provide, to the master, a first target indicating the first bank, a storage request instructing to store the first cacheline, and a first internal transaction comprising the first address, or forward, to the first bank, the first target, the storage request, and the first internal transaction, and control the first bank to invalidate the first cacheline stored in the second bank.

13. The memory device of claim 11, wherein the cache controller is configured to based on a cache miss occurring, change the second target to a first target, the first target indicating the first bank, and provide, to the master, a second internal transaction, the second internal transaction comprising the first target and the first address, or forward the second internal transaction to the first bank.

14. The memory device of claim 9, wherein the cache controller is configured to control the second bank to perform a flush operation that flushes the at least one first cacheline stored in the second bank, and based on the flush operation on the second bank being performed, receive the first transaction.

15. The memory device of claim 14, wherein the cache controller is configured to based on the flush operation being completed, provide, to the master, a response signal notifying to change a hash function comprised in the master.

* * * * *